United States Patent [19]

Nedreski

[11] 3,749,329

[45] July 31, 1973

[54] STATIC FIELD CURRENT CONTROL APPARATUS FOR REEL DRIVES

[75] Inventor: Robert Joseph Nedreski, Erie, Pa.

[73] Assignee: General Electric Company, Erie, Pa.

[22] Filed: Nov. 30, 1971

[21] Appl. No.: 203,284

[52] U.S. Cl.............. 242/75.51, 242/75.47, 318/6
[51] Int. Cl... B65h 25/04, B65h 23/20, B65h 25/22
[58] Field of Search..................... 242/75.5, 75.51, 242/75.52, 75.53; 318/6, 7

[56] References Cited
UNITED STATES PATENTS

| 2,874,917 | 2/1959 | Pell | 242/75.51 |
| 3,114,850 | 12/1963 | Hansen | 242/75.51 X |
| 2,760,129 | 8/1956 | Abell | 318/7 |
| 2,688,111 | 8/1954 | Jones | 242/75.51 X |
| 2,765,989 | 10/1956 | Pell | 242/75.51 |
| 3,189,295 | 6/1965 | Haley | 242/75.5 |
| 3,411,055 | 11/1968 | Carter | 242/75.51 X |

Primary Examiner—George F. Mautz
Assistant Examiner—Edward J. McCarthy
Attorney—James C. Davis, Jr. et al.

[57] ABSTRACT

Static circuit means is provided for controlling the field current of a d-c reel drive motor in response to an input signal proportional to the diameter of strip material on a reel, the field current varying non-linearly with respect to the reel diameter in accordance with:

$$F = D/A + BD$$

where $F$ is proportional to the magnitude of the field current, $D$ is the magnitude of the diameter signal, and $A$ and $B$ are constants established in accordance with the saturation characteristics of the d-c motor such that the field strength resulting from the field current varies linearly with respect to the reel diameter.

8 Claims, 2 Drawing Figures

STATIC FIELD CURRENT CONTROL APPARATUS FOR REEL DRIVES

BACKGROUND OF THE INVENTION

1. Field of the Invention

This invention relates to control of the field current in d-c reel drive motors for strip material handling systems in which strip material is wound upon reels and, more particularly, to improved static means for controlling field current in a predetermined non-linear manner with respect to variations in reel diameter.

2. Description of the Prior Art

In the processing of certain sheet materials, such as sheet steel, the material is commonly handled and worked in strip form. It is often desirable that the material be coiled on a reel driven by a variable speed d-c motor. For uniformity of quality of the strip material, it is essential that the speed of rotation of the reel be precisely controlled with respect to the amount of strip material coiled on the reel. During operation in the constant horsepower range, the reel speed of rotation should vary linearly with respect to the diameter of the strip material on the reel. More particularly, speed of rotation should decrease with increasing reel diameter and increase with decreasing reel diameter. It is known that the proper linear relationship between reel speed and reel diameter is attained by appropriate linear variation of the field strength. However, because of saturation in the magnetic motor structure, the field strength is not directly proportional to the field current, and it is therefore not possible to provide the desired reel speed by merely adjusting the field current in a linear manner with respect to reel diameter.

It has been found that the desired linear variation in field strength may be accomplished through non-linear variation of field current relative to reel diameter. More particularly, it has been determined in accordance with the present invention that the optimum linear variation of field strength may be obtained by varying the field current in accordance with:

$$F = D/A + BD$$

where $F$ is proportional to field current, $D$ has a magnitude proportional to the reel diameter, and $A$ and $B$ are constants established in accordance with the magnetic characteristics of the d-c motor.

SUMMARY OF THE INVENTION

It is an object of this invention to provide means for generating an electric signal which varies in accordance with the foregoing equation.

Another object of this invention is to provide for reel drive systems static means for generating an electric signal which varies non-linearly with respect to reel diameter in a manner such that field current proportional to the electric signal will produce a linear variation in field strength and, consequently, in motor speed.

Yet another object is to provide for reel drive system static means for generating a field current reference signal in accordance with the foregoing equation.

Yet another object is to provide the foregoing objects by static means suitable for use in a wide range of reel drive applications and with d-c motors having a wide range of saturation characteristics.

A still further object is to provide the foregoing objects by static means of relatively simple and uncomplicated form.

Briefly stated, in carrying out the invention in one form, an improved field current signal generating means is provided for a strip material handling system including a reel upon which strip material is wound, a variable speed d-c motor, and motor field current control means responsive to the field current signal generating means. The signal generating means includes static circuit means for producing a signal related in a predetermined non-linear manner to variations in the reel diameter. The signal generating means of this invention also includes means for generating a diameter signal proportional to the diameter of the strip material coiled on the reel. The static circuit means is responsive to the diameter signal to generate a signal having a magnitude defined by:

$$F = D/A + BD$$

where $F$ is the magnitude of the generated signal, $D$ is the magnitude of the diameter signal, and $A$ and $B$ are constants selected in accordance with the saturation characteristics of the d-c motor.

By a still further aspect of the invention, the static circuit means includes a solid state multiplication element coupled to receive a signal proportional to the constant $B$ and the diameter signal and to produce in response thereto an output signal proportional to $BD$, summing means coupled to receive the output signal of the multiplication element and a signal proportional to the constant $A$ and to produce in response thereto an output signal proportional to $A + BD$, and a solid state division element coupled to receive the output signal from the summing means and the diameter signal and to produce in response thereto an output signal having a magnitude defined by the aforesaid equation $F = D/(A + BD)$.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawing, in which:

DETAILED DESCRIPTION

Figure 1:
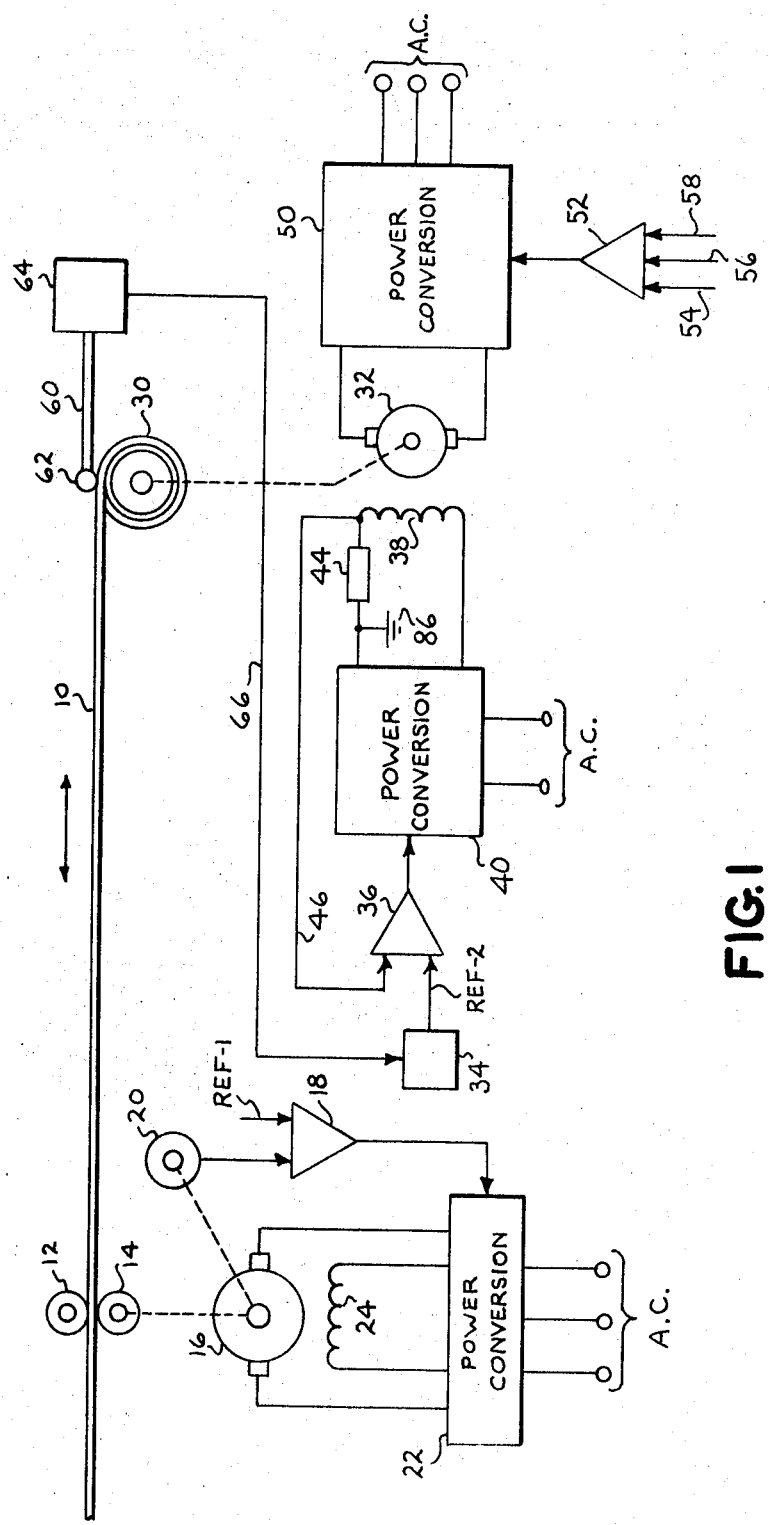
FIG. 1 is a schematic view of a strip material handling system having a reel drive in which the field current of a d-c drive motor is precisely regulated in accordance with this invention.

Referring now to FIG. 1, a strip handling system, such as might be utilized for handling sheet steel and the like, is illustrated in a simplified diagrammatic form. The sheet material, indicated generally by the numeral 10, has a linear velocity determined by the rate of rotation of work rolls 12 and 14, which are driven by a variable speed d-c motor 16. The speed of the motor 16 and, consequently, the linear speed of the strip 10 is regulated by control apparatus 18 in accordance with a reference signal REF-1 supplied to the control apparatus and a speed feedback signal from a tachometer 20 driven by the motor 16. As is well known in the art, the control apparatus 18 operates in response to the reference signal REF-1 and the feedback signal from the tachometer 20 to control the rate at which electric power from an a-c source is transformed to d-c power by power conversion apparatus 22 and supplied to the armature and field windings 24 of the motor 16.

The strip 10 of sheet material is, depending upon the direction in which the strip 10 is driven by the rolls 12 and 14, either wound onto or off of a reel 30, which is driven by a variable speed reversible d-c motor 32. It is desirable that the reel 30 be driven by the motor 32 at a rate which varies in a linear manner relative to the diameter of the strip material on the reel (assuming constant linear strip speed). In the constant horsepower operating range, this can be accomplished by varying the field strength linearly with respect to reel diameter. As pointed out above, the present invention is concerned with static circuit means 34 for generating a reference signal REF-2 as a precise non-linear function of reel diameter. The signal REF-2 is supplied to a field current regulator 36 which controls the actual current supplied to the field windings 38 from power conversion apparatus 40. The power conversion apparatus 40 includes rectifying means for converting alternating current electric power to direct current electric power, the field windings 38 being supplied with d-c current of a magnitude established by the signal REF-2. This is accomplished through the use of a current feedback signal derived from the voltage drop across a resistor 44 in the field circuit. When the actual field current is equal to that called for by the reference signal REF-2 for the desired field strength, the feedback signal on line 46 to the current regulator 36 will be equal to the reference signal REF-2, and the power conversion apparatus 40 will continue to transfer electric power from an a-c source to the field 38 of the motor 32 at a rate sufficient to maintain the desired field strength and reel speed. If, however, due to undue field weakening, the actual reel speed should increase to a value in excess of that speed corresponding to the reference signal REF-2, the negative feedback signal on line 46 will decrease, and the regulator 36 will respond by increasing the field current supplied by the power conversion apparatus 40 so as to thereby decrease the actual reel speed. Similarly, if the actual reel speed should decrease, due to over-excitation of the motor field 38, the negative feedback signal will increase and the regulator 36 will respond by decreasing the field current so as to increase the actual reel speed to that called for by the reference signal REF-2.

The armature windings of the motor 32 are supplied with d-c electric power by power conversion apparatus 50, which includes rectifying means for converting alternating current electric power to direct current electric power. The rate of power conversion by the apparatus 50 is controlled by control apparatus 52. The control apparatus establishes the rate of power conversion in response to suitable input signals, these preferably including signals 54, 56 and 58. Signal 54 represents a reference signal which establishes a desired tension level in the strip material 10 as it is wound onto or off of the reel 30. The reference signal 54 may be of fixed magnitude or it may vary in prescribed manner as the strip material builds up in the reel 30. It is often desirable that the reference signal 54 be reduced as the reel diameter increases. Suitable means for generating a reference signal 54 which varies linearly with respect to reel diameter is disclosed and claimed by copending patent application Ser. No. 203,286, entitled "Tension Reference Signal Generation Means For Reel Drives," filed concurrently herewith in the name of R. J. Nedreski on Nov. 30, 1971, and assigned to the assignee of this invention. The signal 56 represents an inertia compensation signal which is supplied to the control apparatus 52 during periods of strip acceleration or deceleration to assure that the strip tension is regulated in accordance with the reference signal 54 during such periods. The magnitude of the signal 56 is such that the motor 32 supplies additional torque (and armature current) during periods of acceleration and less torque (and armature current) during periods of deceleration. Suitable means for generating the inertia compensation signal is disclosed and claimed by copending U.S. Pat. application Ser. No. 203,285, entitled "Static Means For Generating Inertia Compensation Signals In Reel Drives," filed concurrently herewith in the name of R. J. Nedreski on Nov. 30, 1971, and assigned to the assignee of this invention. The reference signal 54 and the inertia compensation signal 56 will, when combined with a negative feedback signal represented by signal 58, provide a net signal to the control apparatus 52 having a magnitude sufficient to accurately and continuously maintain the tension called for by the reference signal 54.

The novel apparatus of this invention for generating the field current reference signal REF-2 will now be described. The signal generation apparatus includes means for generating a signal proportional to the actual reel diameter. One form of such apparatus is illustrated by FIG. 1. This apparatus includes a lever 60 having a roller 62 on one end thereof, the roller 62 riding on the outer surface of the coil of strip material on the reel 30 so that the position of the lever 60 provides a mechanical indication of the diameter of the strip material on the reel 30. Suitable electrical means, such as a potentiometer, is provided within block 64 to convert the position of the lever 60 into an electrical signal directly proportional to the diameter of the coil of strip material. The electrical signal generated by the electrical apparatus of block 64 is supplied over line 66 to the signal generating network or circuit 34. The exact nature of the apparatus utilized to generate the diameter signal is, of course, not significant with respect to this invention since the signal can be generated in many ways. For example, the electromechanical approach just described could be replaced by an optical arrangement in which the diameter of the coil is sensed optically by photoelectric cells or the like. Other approaches for generating a diameter signal directly proportional to the coil diameter will readily occur to those skilled in the art.

Figure 2:
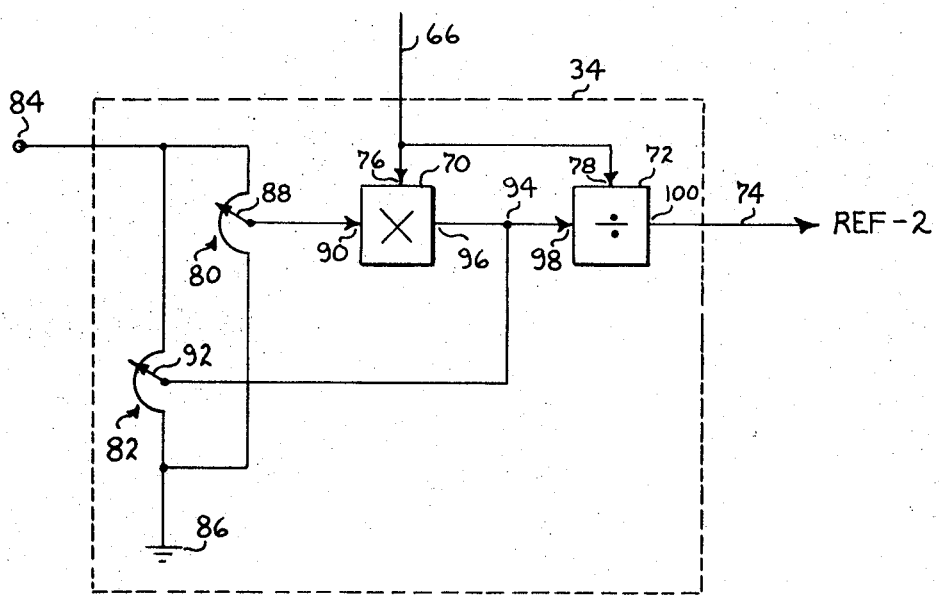
FIG. 2 is a circuit diagram of the static signal generation apparatus of this invention.

Referring now to FIG. 2, the novel and completely static circuit or network 34 will be described. The circuit 34 includes, as shown, a solid state multiplying element 70 and a solid state dividing element 72. The elements 70 and 72 are structurally identical, the arithmetic function of each element being determined by the manner in which it is wired into the circuit. Solid state multiplying and dividing elements of the type illustrated are well-known to those skilled in the art and are commercially available. In one embodiment of the present invention, the elements 70 and 72 were obtained from Motorola Semiconductor Products, Inc. and were identified by the manufacturer as Model MC1595L.

As pointed out previously, the function of the circuit 34 is to receive the diameter signal on line 66 and to generate in response thereto the field current reference signal REF-2 on line 74. Furthermore, the network 34 operates on the diameter input signal such that the resulting reference signal REF-2 is related to the diameter signal in accordance with:

$$F = D/A + BD$$

where $F$ is the magnitude of the reference signal on line 74, $D$ is the magnitude of the diameter signal on line 66, and $A$ and $B$ are constants which are fixed in accordance with the saturation characteristics of magnetic portions of the d-c motor 32 such that the resulting magnitude of $F$ will be that required, throughout the entire range of the diameter signal, to provide a desired linear relationship between reel diameter and field strength (and consequently motor and reel speed).

Still referring to FIG. 2, the line 66 is connected to the multiplying element 70 at multiplying input 76 and to the dividing element 72 at dividend input 78 to supply the diameter signal to both of the elements 70 and 72. The network 34 also includes a pair of adjustable potentiometers 80 and 82 each connected between a source 84 of fixed positive potential and a common point 86 of zero potential. The wiper arm 88 of the potentiometer 80 is adjusted such that a fixed signal equal to the constant B is supplied to the multiplying input 90 of the multiplying element 70, and the wiper arm 92 of the potentiometer 82 is adjusted such that a fixed signal equal to the constant A is supplied to summation means represented by point 94. Summation point 94 is also connected to the product output 96 of element 70 for receiving therefrom a signal equal to the product BD. The summation means represented by point 94 operates on the signals supplied thereto to produce and supply a signal A + BD to divisor input 98 of element 72. Dividing element 72 then operates on the signals D and A + BD supplied thereto to generate at its quotient output 100 the reference signal REF-2, the signal REF-2 having a magnitude D/(A + BD).

From the foregoing, it will be seen that this invention provides completely static means for providing a field current reference signal substantially identical to the theoretically required signal for providing the desired linear variation in field strength relative to reel diameter. Although adjustable potentiometers 80 and 82 are shown, it will be appreciated that no adjustments are made during actual operation of the motor 32, the illustrated adjustable potentiometers being provided so that a single circuit 34 may be utilized in conjunction with a broad range of d-c motors having different saturation characteristics. For a given motor, the potentiometers 80 and 82 are adjusted initially to provide the proper values of the constants A and B for that motor, and there will normally be no need to again adjust the potentiometers 80 and 82.

While the invention has been particularly shown and described with reference to a preferred embodiment thereof, it will be understood by those skilled in the art that various changes in form, details, and application may be made therein without departing from the spirit and scope of the invention. For example, the elements comprising the circuit 34 can take on forms differing from those illustrated and can be combined in various ways to provide the static arithmetic operations described herein. Furthermore, it will be appreciated that it would be possible to construct the static network 34 such that the electric output signal from dividing element 72 comprises the actual field current and not a reference signal. It will also occur to those skilled in the art that the power conversion devices 22, 40 and 50 would typically, but not necessarily be used in the practice of the invention. For example, the control apparatus 36 could be used to control the rate of power transfer from a d-c source to the field windings 38. Accordingly, it is intended that all such modifications and changes be included within the scope of the appended claims.

What is claimed as new and is desired to secure by Letters Patent of the United States is:

1. In strip handling apparatus including a reel upon which strip material may be wound and unwound, a variable speed d-c motor for driving the reel, the d-c motor having armature and field windings, and motor field current supply means comprising:
   means for generating a diameter signal directly proportional to the diameter of the strip material wound on the reel,
   and static circuit means coupled to said diameter signal generation means for receiving said diameter signal therefrom, said static circuit means being responsive to said diameter signal to generate an electric output signal having a magnitude defined by:

$$F = D/(A + BD)$$

where $F$ is the magnitude of the output signal, $D$ is the magnitude of the diameter signal, and $A$ and $B$ are constants having magnitudes established in accordance with saturation characteristics of the d-c motor.

2. Motor field current supply means as defined by claim 1 in which said static circuit means is coupled to the field windings of the d-c motor for supplying the output signal of said static circuit means to the field windings as the motor field current, said constants A and B having magnitudes established such that the field strength varies linearly with the diameter signal.

3. Motor field current supply means as defined by claim 2 further comprising means for generating signals proportional to A and B, said static circuit means comprising a plurality of static circuit elements interconnected to operate on the diameter signal and the signals proportional to A and B to produce the output signal.

4. In strip handling apparatus including a reel upon which strip material may be wound and unwound, a variable speed d-c motor for driving the reel, the d-c motor having armature and field windings, and motor field control means responsive to a reference signal for varying the field current in accordance with variations in the reference signal, reference signal generation means comprising:
   means for generating a diameter signal directly proportional to the diameter of the strip material wound on the reel,
   and static circuit means coupled to said diameter signal generation means for receiving said diameter signal therefrom, said static circuit means being responsive to said diameter signal to generate a reference signal having a magnitude defined by:

$$F = D/(A + BD)$$

where $F$ is the magnitude of the reference signal, $D$ is the magnitude of the diameter signal, and $A$ and $B$ are constants having magnitudes established in accordance with saturation characteristics of the d-c motor such that the field strength varies linearly with the diameter signal.

5. Motor field control means as defined by claim 4 further comprising means for generating signals proportional to A and B, said static circuit means comprising a plurality of static circuit elements interconnected to operate on the diameter signal and the signals proportional to A and B to generate the reference signal.

6. Motor field control means as defined by claim 4 further comprising means for generating signals proportional to A and B, said static circuit means comprising:

first means coupled to said diameter signal generation means to receive the diameter signal therefrom and coupled to receive the signal proportional to B, said first means being responsive to the diameter signal and the signal proportional to B to generate a signal proportional to BD, second means coupled to receive the signal proportional to A and coupled to said first means to receive therefrom the signal proportional to BD, said second means being responsive to the signal proportional to A and the signal proportional to BD to generate a signal proportional to (A + BD), and third means coupled to said diameter signal generation means to receive the diameter signal therefrom and coupled to said second means to receive the signal proportional to (A + BD) therefrom, said third means being responsive to the diameter signal and to the signal proportional to (A + BD) to generate the reference signal.

7. Motor field control means as defined by claim 6 in which said first means comprises a solid state multiplication element and said third means comprises a solid state division element.

8. Motor field control means as defined by claim 7 in which said second means comprises a summing amplifier.

* * * * *